United States Patent [19]
Ramsey et al.

[11] Patent Number: 5,094,751
[45] Date of Patent: Mar. 10, 1992

[54] SELF-CLEANING FILTER ASSEMBLY

[75] Inventors: Bobby B. Ramsey, Hamilton; Charles P. Elmore, Fairfield, both of Ohio; Holden H. Smith, Kingsford; Edward G. Chaperon, Iron Mountain, both of Mich.; David E. Harrison, Bucksport, Me.

[73] Assignee: Champion International Corporation, Stamford, Conn.

[21] Appl. No.: 663,751

[22] Filed: Mar. 1, 1991

Related U.S. Application Data

[63] Continuation of Ser. No. 396,046, Aug. 21, 1989, abandoned.

[51] Int. Cl.⁵ .............................................. B01D 29/62
[52] U.S. Cl. ...................... 210/409; 210/408; 210/411
[58] Field of Search ............... 210/408, 409, 411, 412, 210/427, 407

[56] References Cited

U.S. PATENT DOCUMENTS

| | | | |
|---|---|---|---|
| 1,096,133 | 5/1914 | Shepherd | 210/409 |
| 2,226,164 | 12/1940 | Elian et al. | 210/408 |
| 3,254,772 | 6/1966 | Hornbostel, Jr. | 210/408 |
| 3,273,717 | 9/1966 | Canterbury | 210/409 |
| 3,285,417 | 11/1966 | Schmidt et al. | 210/409 |
| 3,319,794 | 5/1967 | Gross | 210/409 |
| 3,722,681 | 3/1973 | Boorujy | 210/408 |
| 4,201,672 | 5/1980 | Kenyon | 210/409 |
| 4,648,970 | 3/1987 | Hermansson | 210/332 |

FOREIGN PATENT DOCUMENTS

| | | | |
|---|---|---|---|
| 1188559 | 3/1965 | Fed. Rep. of Germany | 210/409 |
| 64-11612 | 1/1989 | Japan | 210/409 |
| 1472099 | 4/1989 | U.S.S.R. | 210/408 |

*Primary Examiner*—James C. Housel
*Attorney, Agent, or Firm*—Evelyn M. Sommer

[57] ABSTRACT

A liquid intake assembly includes a filter member having a shower ring for removing solids from the outside surface of the filter member. The shower ring has an annular portion surrounding the filter member and a plurality of nozzle members for directing pressurized fluid in streams adjacent to and generally parallel to the outside surface of the filter member. The streams generate currents in the suspension removing the solids from the outside surface of the filter member.

11 Claims, 2 Drawing Sheets

SELF-CLEANING FILTER ASSEMBLY

This application is a continuation of application Ser. No. 07/396,046, filed Aug. 21, 1989, abandoned.

FIELD OF THE INVENTION

The present invention relates to a self-cleaning filter assembly for a liquid intake assembly submerged in a suspension. More particularly, the present invention provides a self-cleaning filter assembly for removing solids deposited on the outside surface of the foraminous filter member by directing a pressurized fluid in streams adjacent to and generally parallel to the outside surface of the filter member.

BACKGROUND OF THE INVENTION

Filtering systems for separating solids from a liquid in a suspension become clogged by the solids of the suspension deposited on the outside surface of its screen over a period of time. The screen must be periodicly cleaned to remove the solids deposited on the screen. Usually, the screen or the entire filter must be taken out of the suspension to be cleaned, disrupting the liquid flow through the filter for a significant time period.

Filtering systems in large power plants, such as for steam turbine generators, supply water as coolant for their operation. In a steam turbine generator a large quantity of cooling water is needed for the condenser. Accordingly, the plants are situated adjacent large bodies of water so that cooling water can be easily obtained as needed. However, before such water can be used as a cooling agent, it must first pass through a filter to prevent any solid particles contained in the water from entering the condensor.

After a short period of time these filters tend to collect solid materials, such as wood chips, leaves, grass, fish and other debris on their outer exposed surfaces. This large amount of debris rapidly covers the screen, greatly reducing and even stopping the flow of water through the screen and into the intake for the condenser.

Conventional devices for cleaning the filter screens are disclosed in U.S. Pat. Nos. 4,169,792 to Dovel; 4,518,494 to Jackson; and 4,565,631 to Bitzer et al. However, these conventional cleaning devices suffer from many disadvantages. The devices requiring moving screens or mechanisms are costly to manufacture and to maintain. Some include special movable dividers for causing a backflow or require a reciprocating rake mechanism to clean the filter screen. It is also known to use an air backwash system which releases compressed air within the filter for causing a backwash through the filter screen removing solids deposited thereon.

SUMMARY OF THE INVENTION

Accordingly, an object of the present invention is to provide a self-cleaning filter assembly submerged in a suspension that directs a pressurized fluid in streams adjacent to and generally parallel to the outside surface of the filter member to generate currents in the suspension removing the solids from the outside surface of the filter member.

A further object of the present invention is to provide a self-cleaning filter assembly that is inexpensive and easy to manufacture.

Another object of the present invention is to provide a self-cleaning filter assembly that can be installed onto existing filter assemblies.

A still further object of the present invention is to provide a liquid intake assembly submerged in a suspension having a filter member with nozzle members directing pressurized fluid in streams adjacent to and generally parallel to the outside surface of the filter member to generate currents in the suspension removing the solids from the outside surface of the filter member.

The foregoing objects are basically obtained by a self-cleaning filter assembly which includes a foraminous filter member, a conduit, and nozzle members. The foraminous filter member is mounted in a suspension of liquid and solids and has an outside surface and an inside surface. The suspension flows through the filter member separating the solids of the suspension from the liquid portion. The solids are deposited on the outside surface of the filter member. The conduit is located adjacent the outside surface of the filter member for conveying the pressurized fluid. The nozzle members are coupled to the conduit for directing the pressurized fluid in streams adjacent to and generally parallel to the outside surface of the filter member to generate currents in the suspension removing the solids from the outside surface.

The foregoing objects are further obtained by a liquid intake assembly submerged in a suspension of liquid and solids. The liquid intake assembly includes an inlet pipe, a generally cylindrical foraminous filter, an annular conduit and nozzle members. The inlet pipe has an intake end surrounded by the filter member. The outside surface of the filter member is remote from the intake end of the inlet pipe through which the liquid flows and on which the solids are separated and deposited. The inside surface of the filter member is adjacent the intake end through which filtered liquid of the suspension flows towards the intake end. The conduit is positioned adjacent to the outside surface of the filter member and surrounds it for conveying pressurized fluid. The nozzle members are coupled to the conduit for directing the pressurized fluid in streams adjacent to and generally parallel to the outside surface of the filter member to generate currents in the suspension removing the solids from the outside surface.

The foregoing objects are also obtained by a method of in situ cleaning solids deposited on an outside surface of a foraminous filter member coupled to an inlet pipe and submerged in a suspension of liquid and solids. The method comprises the steps of conveying pressurized fluid adjacent to the outside surface of the filter member, and directing the pressurized fluid in streams. The streams of pressurized fluid move adjacent to and generally parallel to the outside surface of the filter member generating currents in the suspension and removing the solids from the outside surface of the filter member.

By surrounding a filter member with an annular conduit having nozzle members generally parallel or angled slightly towards the outside surface of the filter member, currents are generated adjacent to the outside surface by the flow of pressurized fluid from the nozzle members. The currents remove deposits on the outside surface.

As used herein, "cylindrical" is not limited to a right circular cylinder, as illustrated, but also includes such shapes as parallelepipeds, elliptical cylinders and cones.

Other objects, advantages and salient features of the invention will become apparent from the following detailed description, which, taken in conjunction with the annexed drawings, discloses a preferred embodiment of the invention.

DETAILED DESCRIPTION OF THE INVENTION

Figure 1:
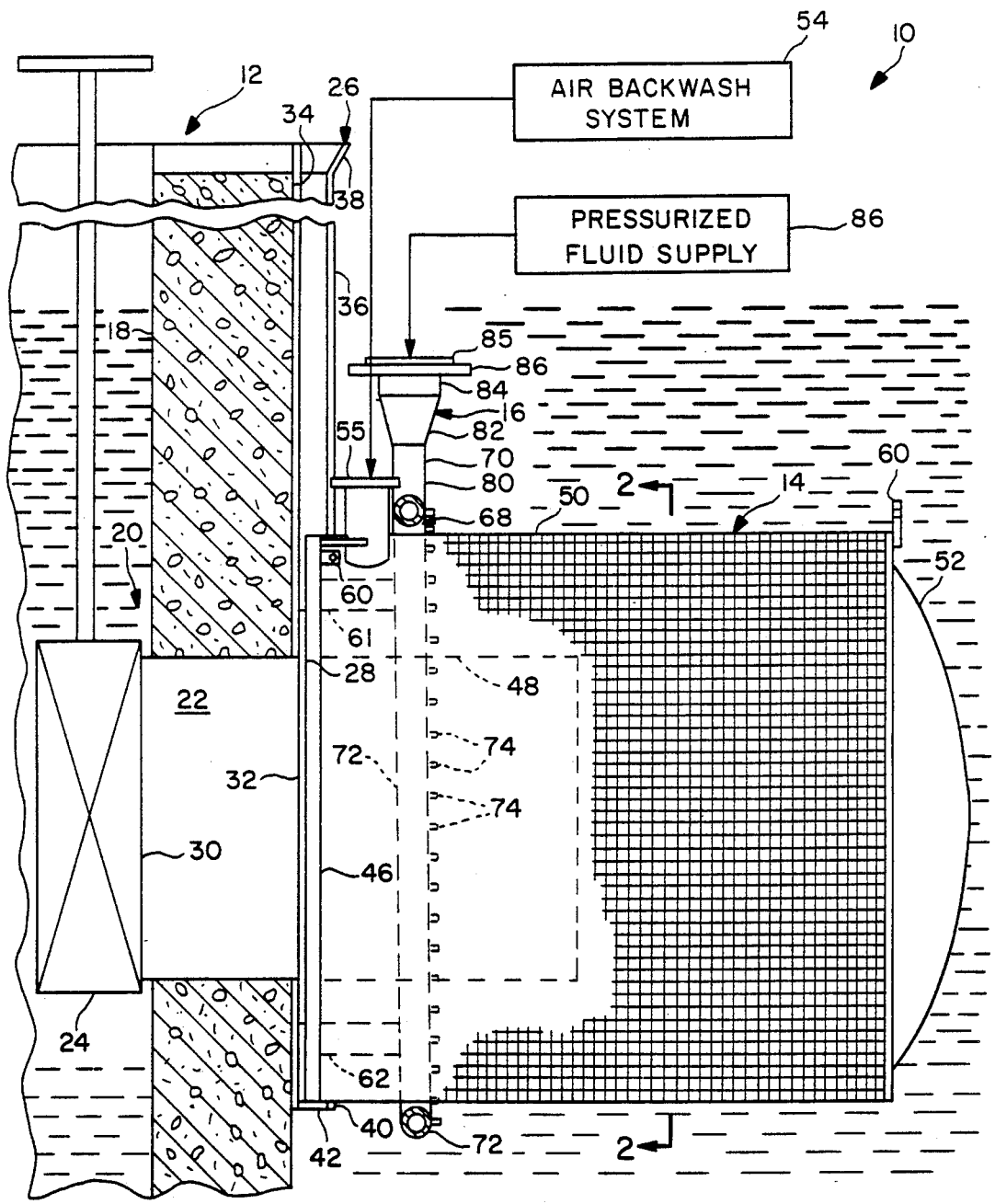
FIG. 1 is a side elevational view of a liquid intake assembly with a self-cleaning filter assembly coupled thereto in accordance with the present invention.
Figure 2:
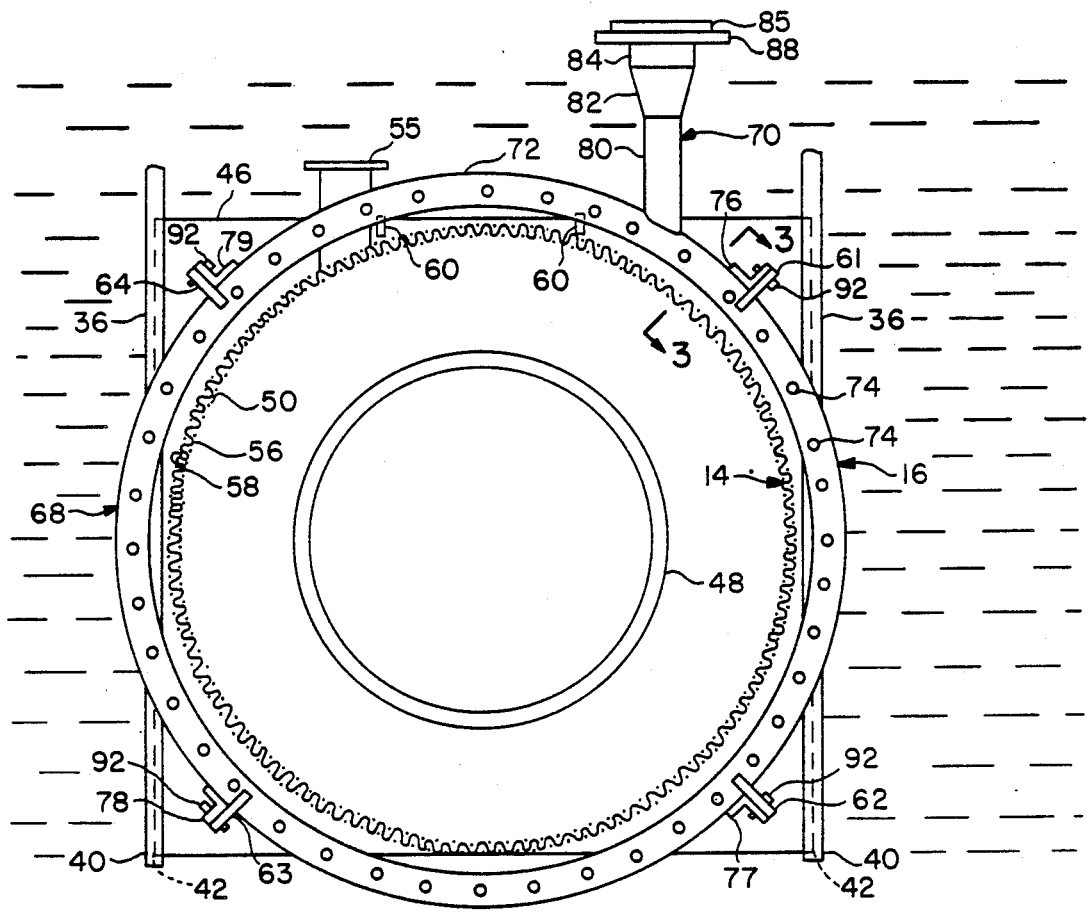
FIG. 2 is an end elevational view in section taken along line 2—2 of FIG. 1.
Figure 3:
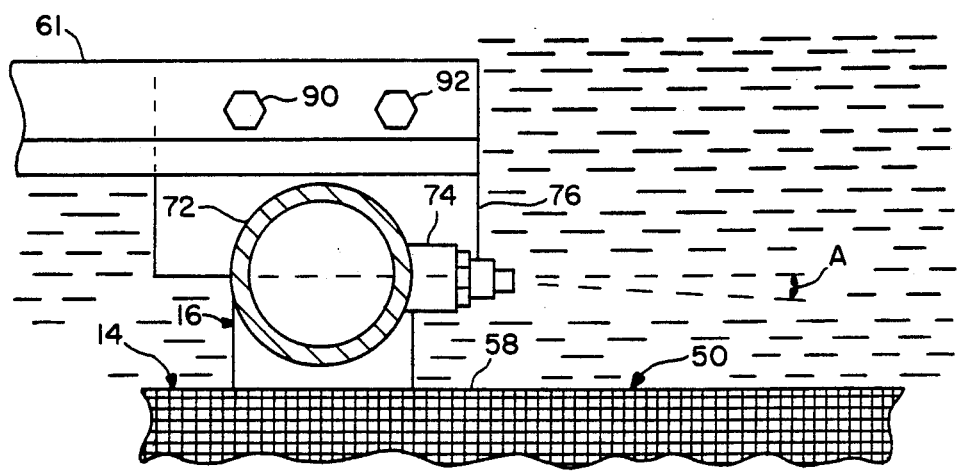
FIG. 3 is an enlarged partial, cross-sectional view of the shower ring taken along line 3—3 of FIG. 2 with the filter member in elevation.

Referring initially to FIG. 1, a liquid intake assembly 10 in accordance with the present invention includes an intake well 12, a foraminous filter member 14 and a shower ring 16. FIGS. 1-3 illustrate liquid intake assembly 10 connected to a power plant, such as a steam turbine generator, for providing cooling water to its condenser. When used with a power plant as illustrated, liquid intake assembly 10 is constructed on the shoreline of a large body of water, such as a lake or a large river, in a conventional manner. Liquid intake assembly 10 is not limited to filtering cooling water for a power plant, as illustrated, but can be used for filtering various suspensions of liquid and solids in other devices.

Intake well 12 includes a concrete wall 18 having a plurality of inlets 20 extending therethrough for drawing liquid from the suspension into intake well 12. Since all of the inlets are substantially identical, only one inlet 20 will be shown and described in detail herein.

Inlet 20, as seen in FIG. 1, includes an inlet pipe 22, a valve assembly 24, a filter guide rail assembly 26 and a sealing plate 28. Inlet pipe 22 extends through concrete wall 18 with valve assembly 24 coupled to its inner end 30 extending into the intake well 12 for opening and closing the flow of liquid through inlet pipe 22. A sealing plate 28, coupled to outer end 32 of inlet pipe 22, extends out of the intake well 12 for engaging filter member 14.

Guide rail assembly 26 is coupled to outer surface 34 of concrete wall 18, and includes a pair of parallel rails 36 extending vertically on outer surface 34 of concrete wall 18. The rails are spaced apart for slideably receiving a portion of filter member 14. Each rail 36 is generally C-shaped in transverse cross section, and has an upper flared end 38 and a lower end 40 with a stop member 42 coupled thereto. Stop member 42 engages filter member 14 to stop its downward movement in rails 36, and aligns filter member 14 with inlet pipe 22.

Filter member 14 includes a guide plate 46, an extension pipe 48, a cylindrical screen portion 50, a dish head 52 and an optional air backwash system 54.

Guide plate 46 is preferably about 72 inches high, about 77 ⅞ inches wide and about 1 inch thick, and made of ½ inch thick stainless steel plate AISI No. 316L coupled to a ½ inch member of a protective material. The guide plate is slideably received between guide rails 36 as seen in FIGS. 1 and 2 for raising and lowering filter member 14 into and out of the suspension. In its lowermost position as seen in FIG. 1, guide plate 46 abuts against sealing plate 28 to form a seal therebetween. Four support members 61, 62, 63 and 64 are coupled to guide plate 46 by welding or other suitable methods, and extend perpendicularly from the guide plate for supporting shower ring 16.

Extension pipe 48 is coupled to guide plate 46 by welding or other suitable methods, and extends substantially perpendicular to guide plate 46. Inlet pipe 22 becomes aligned with extension pipe 48 when filter member 14 is lowered to its lowermost position (i.e., when guide plate 46 engages stop members 42).

Screen portion 50 is substantially cylindrical in shape, preferably a right circular cylinder. As illustrated, the diameter of screen portion 50 is about six feet in diameter and about six feet in length. Screen portion 50 extends substantially perpendicular to guide plate 46 and is coupled thereto by welding or other suitable methods. The screen portion is preferably made of stainless steel (AISI No. 316L) and can be made from screen material manufactured by Johnson under the trademark VEE-WIRE screen having 0.125 inch slot openings.

Dish head 52 is releasably coupled to screen portion 50 and closes the end of filter member 14 remote from guide plate 46. Dish head 52 is preferably made of stainless steel (AISI No. 316L). Three lifting brackets 60 are coupled to filter member 14. One lifting bracket is coupled to the uppermost portion of dish head 52, while the remaining lifting brackets are coupled to guide plate 46. Cables can be coupled to lifting brackets 60 for lowering and raising filter member 14 into and out of the suspension.

Air backwash system 54 has a pipe 55 extending through screen portion 50 into filter member 14 for blowing compressed air therein. The compressed air passes from inside surface 56 through screen portion 50 to remove debris and other solids deposited on outer surface 58 of screen portion 50. Air backwash system 54 is well known in the art, and thus, is not disclosed in detail herein.

Air backwash systems in filtering systems of power plants, as illustrated, do not remove all of the solids (i.e., river debris) deposited on outer surface 58 of screen portion 50 during periods of full moon (i.e., extreme tidal difference). This period experiences extreme quantities of river debris with the changing of the tide.

Shower ring 16 includes a conduit 68 with an inlet portion 70 and an annular portion 72, a plurality of nozzle members 74 and four mounting brackets 76, 77, 78 and 79. Preferably, there are 41 nozzle members 74 equally spaced around annular portion 72 of conduit 68. Each nozzle member is fixedly mounted on conduit portion 72, is in fluid communication with the interior of conduit portion 72, and extends generally parallel to the axis of annular portion 72 and to screen portion 50.

In the illustrated embodiment, conduit 68 is preferably made of stainless steel (AISI No. 316L) with its annular portion 72 made of about 4 inch diameter pipe. The diameter of annular portion 72 from the center of one nozzle member to the center of the opposite nozzle member is about 78 inches.

Inlet portion 70 has a first portion 80, a transition portion 82, and a second portion 84. First portion 80 has a diameter of about 4 inches while second portion 84 has a larger diameter equal to the diameter of the conduit extending from pressurized fluid supply 86. An annular flange 85 extends from the free end of second portion 84 and is engaged by a moveable coupling ring 86. Ring 86 slideably surrounds inlet portion 70 for coupling shower ring 16 to a conduit extending from pressurized fluid supply 86.

Fluid supply 86 can be from the water discharge from the intake pumps or other suitable source such as the fire protection system. In any event, the fluid supply should be capable of delivering a pressure greater than 30 psi.

Referring now to FIG. 3, nozzle members 74 are preferably angled slightly towards the adjacent portion of outside surface 58 of screen portion 50 at an angle A. Preferably, angle A is about 2°-30 minutes. In the illustrated embodiment, nozzle members 74 are preferably ⅜ inch diameter nozzles with a ¼ inch diameter orifice capable of emitting 9.3 gallons of water per minute at a velocity of 60.78 feet per second at the tip of the nozzle members. The streams of current generated in the suspension by nozzle members 74 should have a velocity of about 1.57 feet per second at the end of screen portion 50 adjacent to dish head 52.

Shower ring 16 is releasably coupled to guide plate 46 of filter member 14. Support arms 61–64 extending perpendicular to guide plate 46 are coupled to brackets 76–79 by bolts 90 and 92, as seen in FIG. 3. Brackets 76–79 are fixed to annular portion 72 in any suitable manner.

In operation, shower ring 16 is coupled to filter member 14 and then lowered into the suspension by placing guide plate 46 between rails 36 and allowing the filter member to slide down into the suspension. The downward movement of filter member 14 is stopped when guide plate 46 engages stop members 42, aligning extension pipe 48 with inlet pipe 22.

Water entering intake well 12 via inlet pipe 22 must pass through screen portion 50 of filter member 14. When solids begin to deposit upon screen portion 50 of filter member 14, high pressure fluid is supplied through conduit 68 to nozzle members 74 for directing the pressurized fluid in streams adjacent to and generally parallel to outside surface 58 of filter member 14. The streams generate currents in the suspension to remove the solid deposits from outside surface 58 of screen portion 50.

While only one embodiment has been chosen to illustrate the invention, it will be understood by those skilled in the art that various changes and modifications can be made therein without departing from the scope of the invention as defined in the appended claims.

What is claimed is:

1. A self-cleaning filter assembly, comprising:
a generally cylindrical foraminous filter member having opposed first and second longitudinal ends, said filter member being mounted in a suspension of liquid and solids having an outside surface through which the suspension flows and on which solids of the suspension are separated and deposited, and an inside surface through which a filtered liquid portion of the suspension flow;
an annular conduit, fixedly located adjacent said first end of said filter member and surrounding said outside surface, for conveying pressurized fluid; and
a plurality of spaced apart nozzle members coupled to said conduit, for directing the pressurized fluid toward said second end of said filter member in streams adjacent to and generally parallel to said outside surface of said filter member to generate currents in the suspension removing the solids from said outside surface without the use of brushes.

2. A self-cleaning filter according to claim 1 wherein each of said nozzle members is angled to about 2.5° towards said outside surface.

3. A self-cleaning filter according to claim 1 wherein said filter member is generally a right circular cylinder.

4. A self-cleaning filter according to claim 1 wherein said conduit has a plurality of brackets extending therefrom releasably coupling said conduit about said filter member.

5. A liquid intake assembly submerged in a suspension of liquid and solids, comprising:
an inlet pipe having an intake end;
a generally cylindrical, foraminous filter member having opposed first and second ends, the first end of the filter member surrounding said intake end of said inlet pipe, said filter member having an outside surface remote from said intake end through which the liquid flows and on which the solids are separated and deposited, and an inside surface adjacent said intake end through which filtered liquid of the suspension flows toward said intake end of said inlet pipe;
an annular conduit, fixedly located adjacent said first end of said filter member and surrounding said outside surface, for conveying pressurized fluid; and
a plurality of spaced apart nozzle members, coupled to said conduit, for directing the pressurized fluid in streams adjacent to and generally parallel to said outside surface of said filter member and away from the first end to generate currents in the suspension removing the solids from said outside surface without the use of brushes.

6. A liquid intake assembly according to claim 5 wherein each of said nozzle members is angled at about 2.5° towards said outside surface.

7. A liquid intake assembly according to claim 5 wherein
said filter member is generally a right circular cylinder.

8. A liquid intake assembly according to claim 5 wherein
said conduit has a plurality of brackets extending therefrom releasably coupling said conduit to said filter member.

9. A liquid intake assembly according to claim 5 wherein
the volume of each of said pressurized streams of fluid is substantially nine gallons of water a minute at the tip of each of said nozzle means,
and the velocity of each of said pressurized streams of fluid is substantially 60 feet per second at the tip of each of said nozzle means.

10. A liquid intake assembly according to claim 5 further comprising
a dish head mounted at the second end of said foraminous filter member.

11. A liquid intake assembly according to claim 5 further comprising
a dish head mounted at the second end of said foraminous filter member, and wherein
the velocity of each of said pressurized streams of fluid is substantially 60 feet per second at the tip of each of said nozzle means
and the velocity of each of said pressurized streams of fluid at said second end of said filter member adjacent said dish head is substantially 1.5 feet per second.

* * * * *